United States Patent

Watanabe

[11] Patent Number: 5,930,548
[45] Date of Patent: Jul. 27, 1999

[54] DEVELOPMENT ASSISTING APPARATUS FOR INSTANT CAMERA FILM

[76] Inventor: Katsuzo Watanabe, 10-4, Yoshioka-cho, Niitsu, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/803,156

[22] Filed: Feb. 19, 1997

[30] Foreign Application Priority Data

Dec. 27, 1996 [JP] Japan ................................ 8-013200 U

[51] Int. Cl.⁶ .............................. G03D 13/00; G03D 7/00
[52] U.S. Cl. .............................. 396/571; 396/30; 396/575
[58] Field of Search ...................... 396/571, 578, 396/575, 30; 355/100, 106, 405; 219/216, 220

[56] References Cited

U.S. PATENT DOCUMENTS

| | | | |
|---|---|---|---|
| 3,288,047 | 11/1966 | Limberger | 355/100 |
| 3,478,665 | 11/1969 | Umahashi et al. | 219/216 |
| 3,608,466 | 9/1971 | Devries et al. | 396/661 |
| 3,989,377 | 11/1976 | Smith | 355/85 |
| 4,176,273 | 11/1979 | Fujie et al. | 219/220 |
| 4,740,074 | 4/1988 | Powell | 396/571 |
| 5,489,961 | 2/1996 | Burbury et al. | 396/571 |

FOREIGN PATENT DOCUMENTS

| | | |
|---|---|---|
| 54-153237 | 4/1978 | Japan . |
| 61-164736 | 10/1986 | Japan . |
| 62-55135 | 11/1987 | Japan . |
| 64-33538 | 2/1989 | Japan . |

OTHER PUBLICATIONS

Copy of the Technical Evaluation Report issued by the Japanese Patent Office (on or before Jul. 24, 1998) in connection with counterpart Japanese Utility Model Application No. 8–13200.
Copy of an English Language Translation of the Technical Evaluation Report.

*Primary Examiner*—D. Rutledge
*Attorney, Agent, or Firm*—Greenblum & Bernstein P.L.C.

[57] ABSTRACT

A development assisting apparatus is provided which can give a finish of uniform quality and in a short time, irrespective of changes in temperature due to regional temperature differences or changes with the seasons. A case side clamping face 6 is provided on a front face of a case body 2, and an openable lid 3 with a lid side clamping face 16 provided on an inner face thereof, is hinged so as to be openable relative to the case side clamping face 6. A heating device 7 is provided on the case body 2, and in this case the case side clamping face 6 rather than the lid side clamping face 16 is heated so that an instant camera film 1 pressed and held between the clamping faces 6, 16 is kept warm. Due to the film 1 being kept warm by the heating and heat retention, then uniform development without irregularities is possible.

9 Claims, 5 Drawing Sheets

DEVELOPMENT ASSISTING APPARATUS FOR INSTANT CAMERA FILM

BACKGROUND OF THE INVENTION

1. Field of the Invention

The present invention relates to a development assisting apparatus for instant camera film, which is used in developing instant camera film, enabling easy development of the film once exposed, and giving a finished photograph in a short time.

2. Description of the Related Art

With instant cameras, instant camera films such as the peel apart type incorporating a negative film and a positive paper are widely used. With these instant camera films, after exposure the film is removed from the camera, a bag containing processing agent being ruptured and at the time of removal by a roller on the camera side. As a result the processing agent spreads between the negative film and the positive paper, and after a predetermined time a developed positive paper is obtained. An example of this film is the Polaroid film (trademark of the Polaroid Company). Furthermore, the so called mono sheet type films, of the non peel apart type are also known.

Conventionally, the film which has been taken out of the camera, is warmed by rubbing it with hands, or using a warm air blower, or by soaking in hot water. Moreover, in Japanese Unexamined Patent Publication No. 64-33538, there is proposed an instant camera wherein a pair of rollers are provided in a film removal opening of a film cartridge in the camera, and a heater is housed inside the rollers.

With development using a developer, since a chemical reaction is involved, then temperature management is important. With the conventional methods however, due for example to differences in temperature with the seasons, it is not possible to carry out processing at an appropriate temperature for the processing agent. Therefore, due to poor coloring and poor contrast an attractive photograph with good definition cannot be reliably obtained. Moreover, with the abovementioned instant camera disclosed in Japanese Unexamined Patent Publication No. 64-33538, the roller makes line contact with the film, so that the film is only heated while passing through the roller. Therefore, during the development after removal from the camera, the film cannot be kept warm. Moreover, since the heater is housed inside the camera, then heat from the heater can have an undesirable influence on the film which has not yet been exposed. Furthermore, particularly during winter or in cold regions, then even if an insulated box or the like is used, development time is increased, so that there is the problem of variations in quality. Moreover, with the spreading of the processing agent between the negative film and the positive paper by the roller on the camera side, the situation can arise where due to deterioration of the roller, the processing agent is not spread evenly. Therefore, even if pressure is applied by hand, the processing agent will not be spread evenly. Consequently, with the conventional method, development irregularities occur due to the ambient temperature at the development site, or due to unevenness of the processing agent resulting for example from deterioration of the roller, thus making it difficult to obtain a finish of uniform quality.

SUMMARY OF THE INVENTION

A primary object of the present invention is therefore to provide a development assisting apparatus for instant camera film, which gives a finish of uniform quality.

Moreover, another object of the present invention is to provide a development assisting apparatus for instant camera film, which is small in size, easy to use, and portable.

To achieve the above objects, the present invention basically comprises; a pair of closeable clamping faces for clamping an instant camera film, and a heating and heat retention device for maintaining a temperature of film clamped between the clamping faces.

Moreover, to solve the above problems, the present invention comprises: a case side clamping face provided in a case body, an openable lid provided so as to be openable and closeable relative to the case side clamping face, a lid side clamping face provided on an inner face of the openable lid and facing the case side clamping face, and a heating and heat retention device for heating the case side clamping face or the lid side clamping face and maintaining a temperature of instant camera film pressingly clamped between the clamping faces.

Furthermore, with the present invention, to solve the above problems, the heating device is an electric heater which is housed inside the case body, and a heat retention control device is housed inside a control case separate from the case body, and batteries for the electrical heater are housed in a battery case separate from the case body.

DESCRIPTION OF THE PREFERRED EMBODIMENTS

Figure 1:
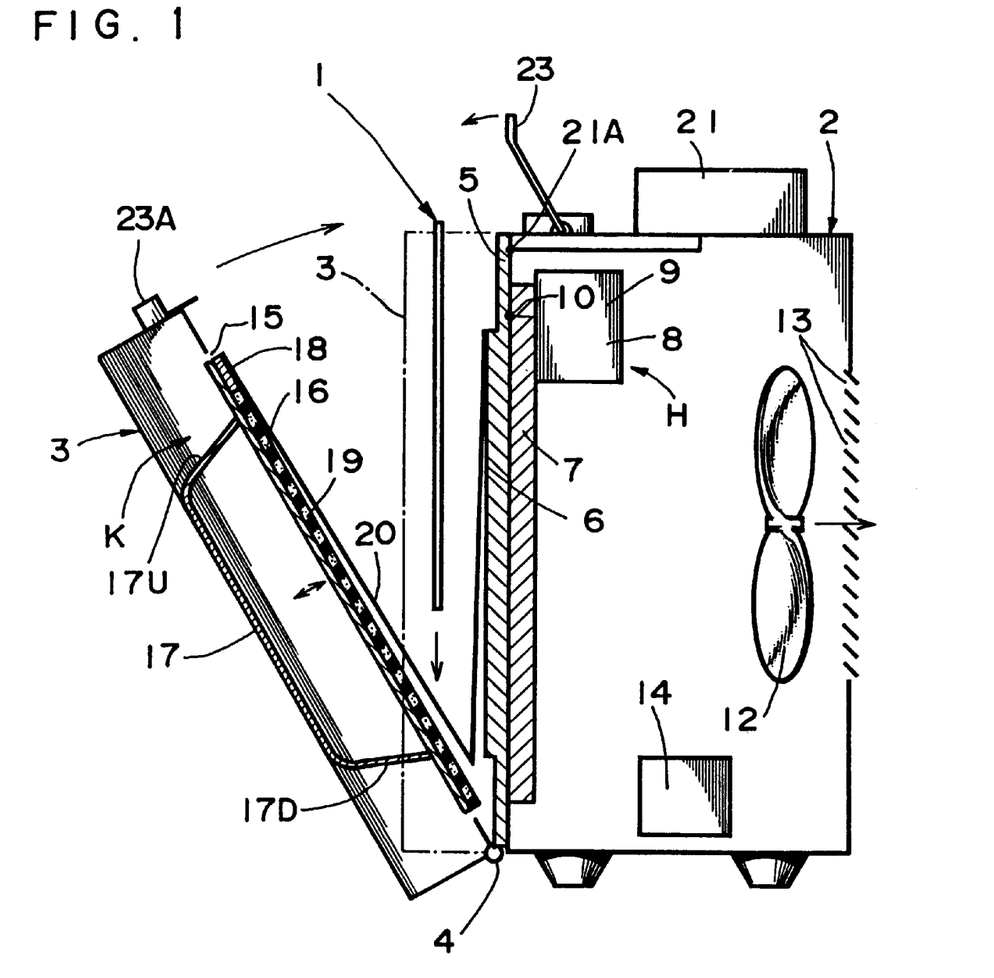
FIG. 1 is a transverse sectional view of a first embodiment of the present invention.
Figure 2:
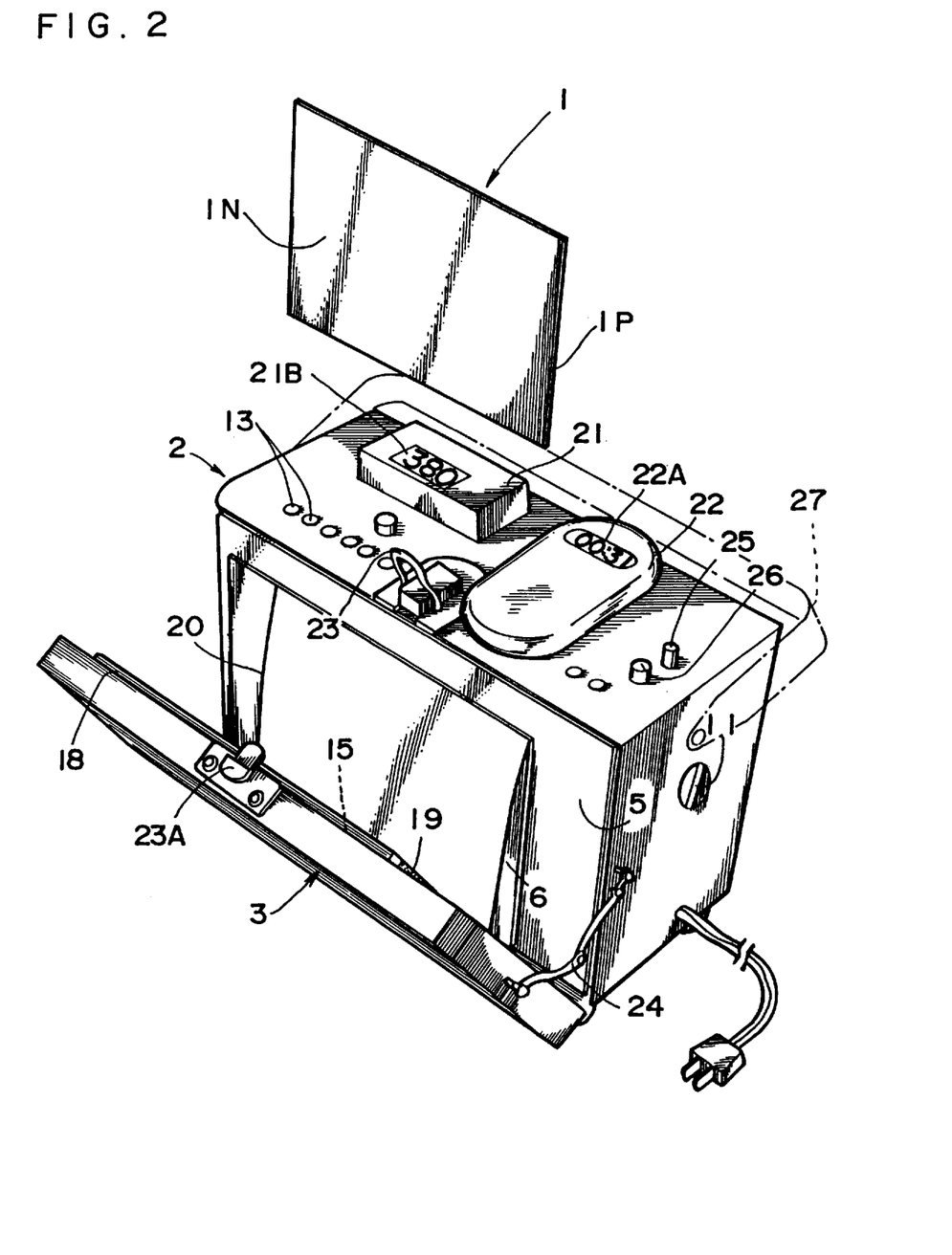
FIG. 2 is a perspective view of the first embodiment, with an openable cover in the open condition.
Figure 3:
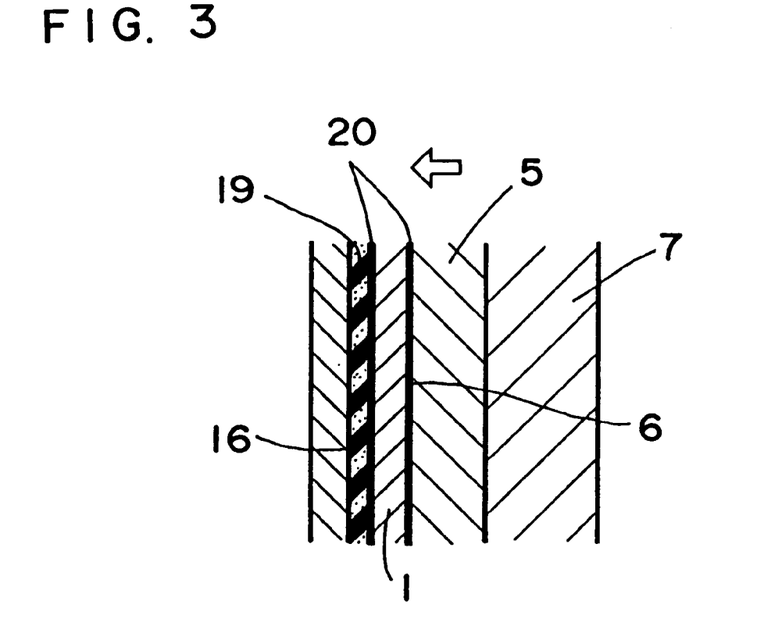
FIG. 3 is an enlarged cross-sectional view illustrating the first embodiment with a film clamped between clamping faces.

As follows is a description of embodiments of the present invention, with reference to the accompanying drawings. FIG. 1 through FIG. 3 show a first embodiment of the present invention. An instant camera film 1 as shown for example in FIG. 1, has been taken out from a camera (not shown in the figure) after exposure. With the film 1, the negative film and positive paper are laminated together, with a processing agent for film development (not shown in the figures) provided therebetween.

The development assisting apparatus for the film 1 comprises a rectangular case body 2, and an openable lid 3. The openable lid 3 is hinged at a lower portion to a lower portion of the front face of the case body 2 by a hinge 4, so as to be openable and closable. A front plate 5 of aluminum plate or the like having good heat conduction, is provided on the front face of the case body 2. A forward protruding case side clamping face 6 is formed at the center of the front plate 5, facing the film 1. A heating device 7 such as an electric heater, is provided on a rear face of the front plate 5. With this example, a ceramic heater with the electrical wiring covered with ceramic is used for the heating device 7.

Moreover, there is provided a heat retention control device 8 for controlling the heating of the heating device 7. The heat retention control device 8 comprises a circuit board 9 incorporating electronic control components and the like. The circuit board 9 is electrically connected to a temperature sensor 10 for measuring the temperature of the front plate 5. The heat retention control device 8 carries out control using a temperature setting device 11 such as a control knob provided on the side face of the case body 2, so as to hold the temperature of the case side clamping face 6 at a set temperature. The heating device 7 and the heat retention control device 8 are housed within the case body 2. Moreover, a cooling fan 12 for controlling temperature over shoot, is provided in the case body 2 for force cooling the interior of the case body 2. Ventilation openings 13 are formed in the upper and lower faces and rear face of the case body 2. The rear face ventilation opening is formed as a grill adjacent to the cooling fan 12. The development assisting apparatus of the present invention is operated by household AC power. However a converter 14 for converting DC to AC is provided inside the case body 2. As a result, operation is also possible by connecting to a vehicle battery. Furthermore, the present invention is not limited to a household AC power source, and other portable power sources such as nickel cadmium batteries, lithium iron batteries, and alkaline batteries can be used. For the heating device 7, iron oxidation heating or chemical reaction heating can be utilized. A heating and heat retention device H for keeping the film 1 warm, is made up from the heating device 7 and the heat retention control device 8.

The openable lid 3 is formed on the rear face side thereof with a central space having an opening 15. A flat plate lid side clamping face 16 is provided in the opening 15 so as to be moveable towards the front and rear (inwards and outwards relative to the openable lid 3). A plate spring 17 serving as a resilient urging device, is provided on a rear portion of the lid side clamping face 16. The plate spring 17 is secured at the center to the inner face of the front plate of the openable lid 3, with tip ends of upper and lower half portions 17U, 17D secured to the lid side clamping face 16. With the plate spring 17 in the pre-deformed condition, the lid side clamping face 16 is located substantially coplanar with the inner face of the openable lid 3. A resilient pressure applying device K is made up from the lid side clamping face 16 provided on the inner face of the openable lid 3 so as to be moveable inwards and outwards, and the plate spring 17 serving as a resilient urging device. A fixed plate 18 is provided transversely on the upper portion of the lid side clamping face 16. The fixed plate 18 is made for example from a hard material such as acrylic sheet. A sponge 19, serving as another example of a resilient pressure applying device, is adhered to the lid side clamping face 16 below the fixed plate 18. Upper portions of a retaining sheet 20 which is folded at a lower edge, are respectively fixed to upper portions of the fixed plate 18 and the case side clamping face 6. When the film 1 is clamped between the clamping faces 6 and 16, the sponge 19 is resiliently deformed, so that the film 1 is pressed under a resilient restoring force.

A thermometer 21 and a timer 22 are provided on an upper face of the case body 2. The thermometer 21 uses a sensor 21A provided at a suitable location on the rear face of the front plate 5, and displays the temperature of the sensor 21A in a temperature display portion 21B. The timer 22 displays elapsed time on a time display section 22A, and the time from starting until the lapse of a set time is notified for example using a buzzer (not shown in the figures).

Closing catches 23, 23A which engage with each other, are provided on respective upper portions of the case body 2 and the openable lid 3, while a hinged link 24 is provided between side portions of the case body 2 and the openable lid 3. An electrical switch 25 for switching on the apparatus, is provided on an upper portion of the case body 2, together with a pilot lamp 26 which comes on when the switch 25 is switched on. Moreover the case body 2 is provided with a carrying handle or strap 27.

Next is a description of a method of using the above apparatus. At first, the switch 25 is switched on to start the apparatus, and a required temperature is set using the temperature setting device 11. The temperature differs depending on the type of film 1, however generally it is desirable to set this to around 27–35 degrees. With this apparatus, the temperature is controlled to within plus or minus 1 degree of the set temperature. When peel apart type film is used, then in the case of film made by the Polaroid company, around 27 degrees is preferable, while in the case of Photorama film made by the Fuji Film Company, around 33 degrees is preferable. By checking the temperature display section 21B, it can be verified if the case side clamping face 6 has reached the set temperature. Once the desired temperature has been reached, the film 1 is placed into the retaining sheet 20, and the openable lid 3 then closed and secured with the closing catches 23, 23A. At the time of closing the openable lid 3, the lid side clamping face 16 is pressed towards the front by an amount corresponding to the protrusion dimension of the case side clamping face 6 and the thickness of the film 1, so that the upper and lower portions 17U 17D of the plate spring 17 are resiliently deformed. At the same time, the lid side clamping face 16 presses against the case body 2 side under the resilient restoring force of the plate spring 17, so that the sponge 19 is also resiliently deformed. As a result, the film 1 is clamped under uniform conditions, between the clamping faces 6, 16. Due to the close contact heating, the developing processing agent inside the film 1 reaches the set temperature in a few seconds. The film 1 is then maintained at a constant temperature in the pressed condition, by the heat retention control device 8. Then, once a predetermined time (for example 1 second) has elapsed, the openable lid 3 is opened and the film 1 removed. With the normal method, when the negative film 1N is peeled off, a developed positive paper 1P is obtained. With a mono sheet type film where a negative film is not peeled off, the image on the positive paper appears in detail. By clamping the film 1 between the faces and applying a uniform pressure as described above, then the processing agent works evenly. In addition, by maintaining the film 1 at a constant temperature, then development with good contrast, clear coloring and sharp edges without irregularities is possible.

With this embodiment, since it comprises the pair of openable clamping faces 6, 16 for clamping the instant camera film 1, and the heating and heat retention device H for heating the film 1 clamped between the clamping faces 6, 16, then the film 1 clamped between the clamping faces 6, 16 is kept warm. Therefore, development is carried out under constant conditions with the film kept at an even temperature throughout, and hence a uniform quality finish without irregularities is obtained. For the film, a mono sheet type film can also be used.

As described above, the present embodiment comprises: the case side clamping face 6 provided on the case body 2, the openable lid 3 provided so as to be openable and closeable relative to the case side clamping face 6, the lid side clamping face 16 provided on the inner face of the openable lid 3 and facing the case side clamping face 6, and the heating and heat retention device H for heating in this case, the case side clamping face 6, and maintaining the temperature of the instant camera film 1 which is pressingly clamped between the clamping faces 6, 16. With this construction, the openable lid 3 can be removed or opened, the film 1 inserted between the case side clamping face 6 and the lid side clamping face 16, and the openable lid 3 then shut and set so that the film 1 is clamped under pressure and kept warm by the heating and heat retention device H. Hence uniform development without irregularities can be carried out in a very short time. The development time varies depending on the film type, however in the case of color, this is around 40 second while with monochrome, this is around 25 seconds.

Furthermore, with the above described embodiment, the openable lid 3 is pivotally mounted to the case body 2 so as to be openable and closable, and the heating and heat retention device H comprises: a heating device 7 for heating the case side clamping face 6, and a heat retention control device 8 for maintaining the case side clamping face 16 heated by the heating device 7 at a constant temperature, and there is provided in the openable lid 3 a resilient pressure applying device K or a sponge 19 serving as resilient pressure applying device, for applying pressure to the film 1. With this construction, the openable lid 3 pivotally mounted to the case body 2 is opened, and the film 1 is inserted between the case side clamping face 6 and the lid side clamping face 16, and the openable lid 3 then shut and set. The case side clamping face 6 is then heated by the heating and heat retention device H, and the temperature kept constant by means of the heat retention control device 8. Furthermore, the film 1 clamped between the case side clamping face 6 and the lid side clamping face 16, is clamped at a constant pressure by the resilient pressure applying device K incorporating the plate spring 17, and by the sponge 19 serving as a resilient pressure applying device, so that the time to reach the set temperature for the developing processing agent is only a few seconds. Therefore, development is carried out at constant temperature and pressure and hence a uniform quality finish without irregularities is obtained in a short time.

In addition, with this embodiment, the heating device 7 and the circuit board 9, serving as the heat retention control device 8, are housed within the case body 2, thus enabling portability.

Also, with this embodiment, the case side clamping face 6 is arranged so as to protrude outwards, and the resilient pressure applying device K comprises: the lid side clamping face 16 provided on the inner face of the openable lid 3 so as to be moveable inwards and outwards, and the plate spring 17 serving as a resilient urging device for urging the lid side clamping face 16 outwards. With the openable lid 3 open, the film 1 can be easily set, and when the openable lid 3 is closed, the lid side clamping face 16 is pressed inwards due to the outwardly protruding case side clamping face 6, and is urged outwards by the plate spring 17. Hence the film 1 between the clamping faces 6, 16 can be pressed positively and evenly.

Moreover this embodiment comprises: a temperature setting device 11 for setting a temperature of the case side clamping face 6, a temperature display section 21B for displaying the temperature of the case side clamping face 6, and a timer 22 which can measure time. Therefore the film 1 can be held at a desired temperature by means of the temperature setting device 11, and this holding temperature can be verified by the temperature display section 21B.

Moreover, the film 1 is taken out after a predetermined time determined by the timer 22, enabling development to be carried out with a constant warming time. Furthermore, a buzzer is sounded after a predetermined time determined by the timer 22, thus ensuring uniform quality development, with the film 1 being taken out after being subjected to a constant warming temperature for a predetermined time.

Figure 4:
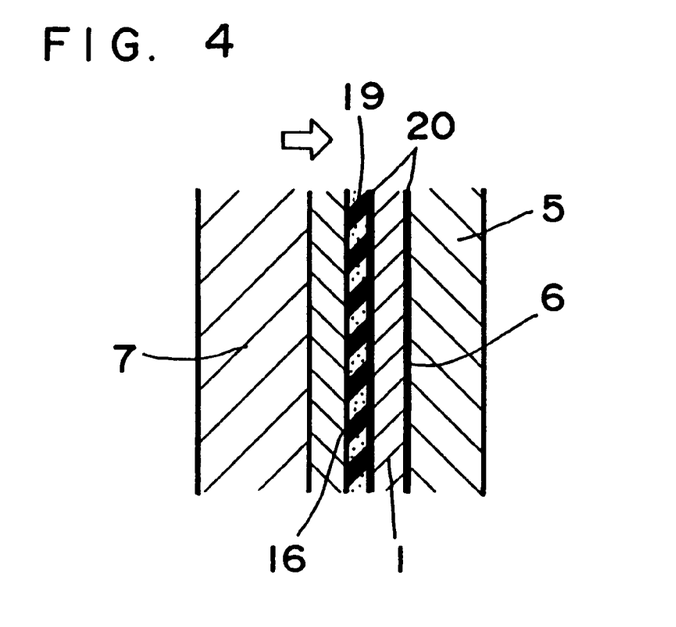
FIG. 4 is an enlarged cross-sectional view illustrating a second embodiment of the present invention, with a film clamped between clamping faces.

FIG. 4 illustrates a second embodiment of the present invention. Components the same as for the first embodiment are denoted by the same symbol and their description is omitted. This embodiment has a heating device 7 and a heat retention control device 8 provided in the openable lid 3, a case side clamping face 6 provided on a case body 2, an openable lid 3 provided so as to be openable and closeable relative to the case side clamping face 6, a lid side clamping face 16 provided on an inner face of the openable lid 3 and facing the case side clamping face 6, and a heating and heat retention device H for heating in this case, the lid side clamping face 16, and maintaining the temperature of the instant camera film 1 which is pressingly clamped between the clamping faces 6, 16. With this construction, the openable lid 3 can be removed or opened, the film 1 inserted between the case side clamping face 6 and the lid side clamping face 16, and the openable lid 3 then shut and set so that the film 1 is clamped under pressure and kept warm by the heating and heat retention device H. Hence uniform development without irregularities can be carried out. The unfilled arrows in FIG. 3 and FIG. 4 indicate the direction of heat transmission.

Figure 5:
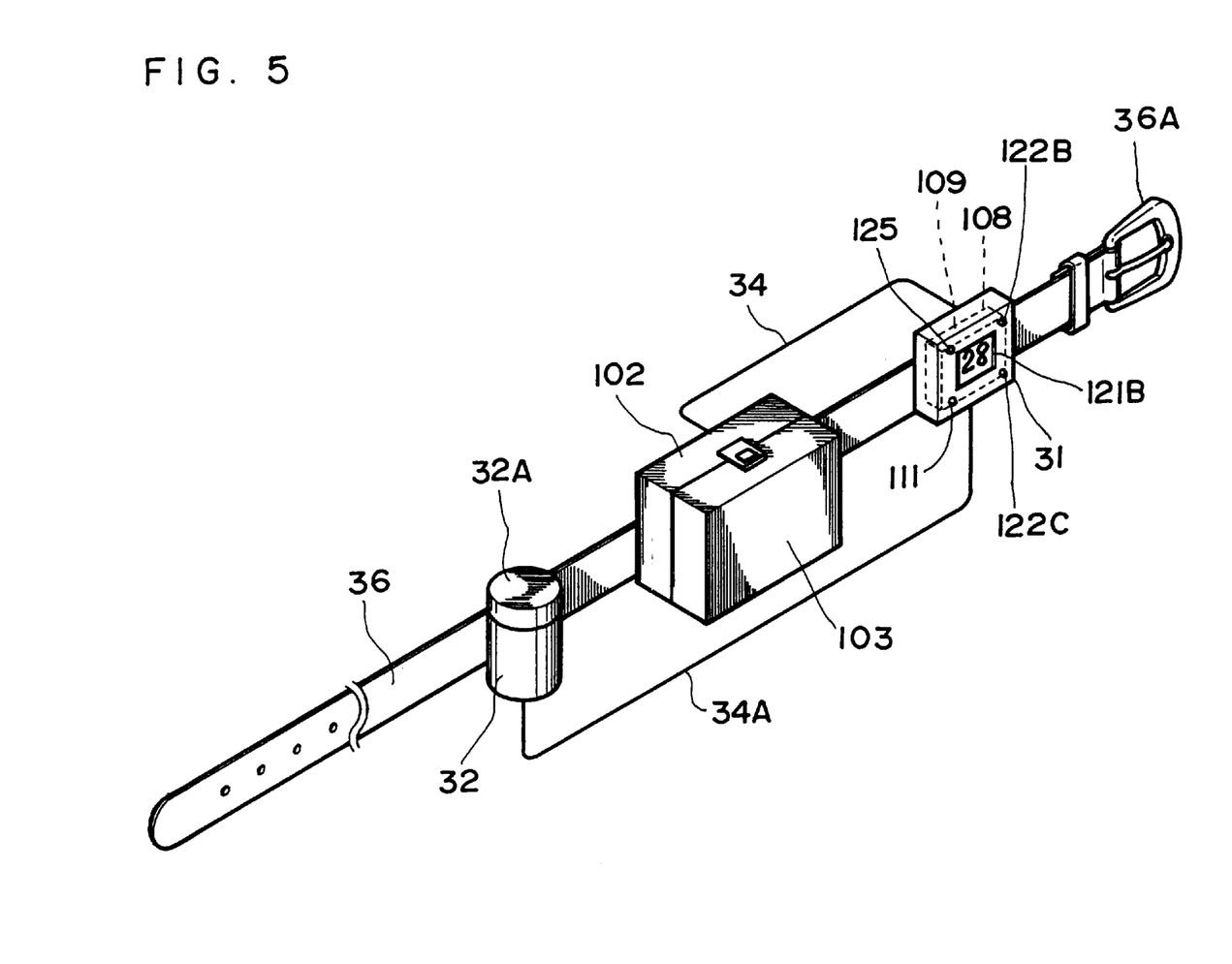
FIG. 5 is a perspective view of a third embodiment of the present invention, showing an apparatus attached to a belt.
Figure 6:
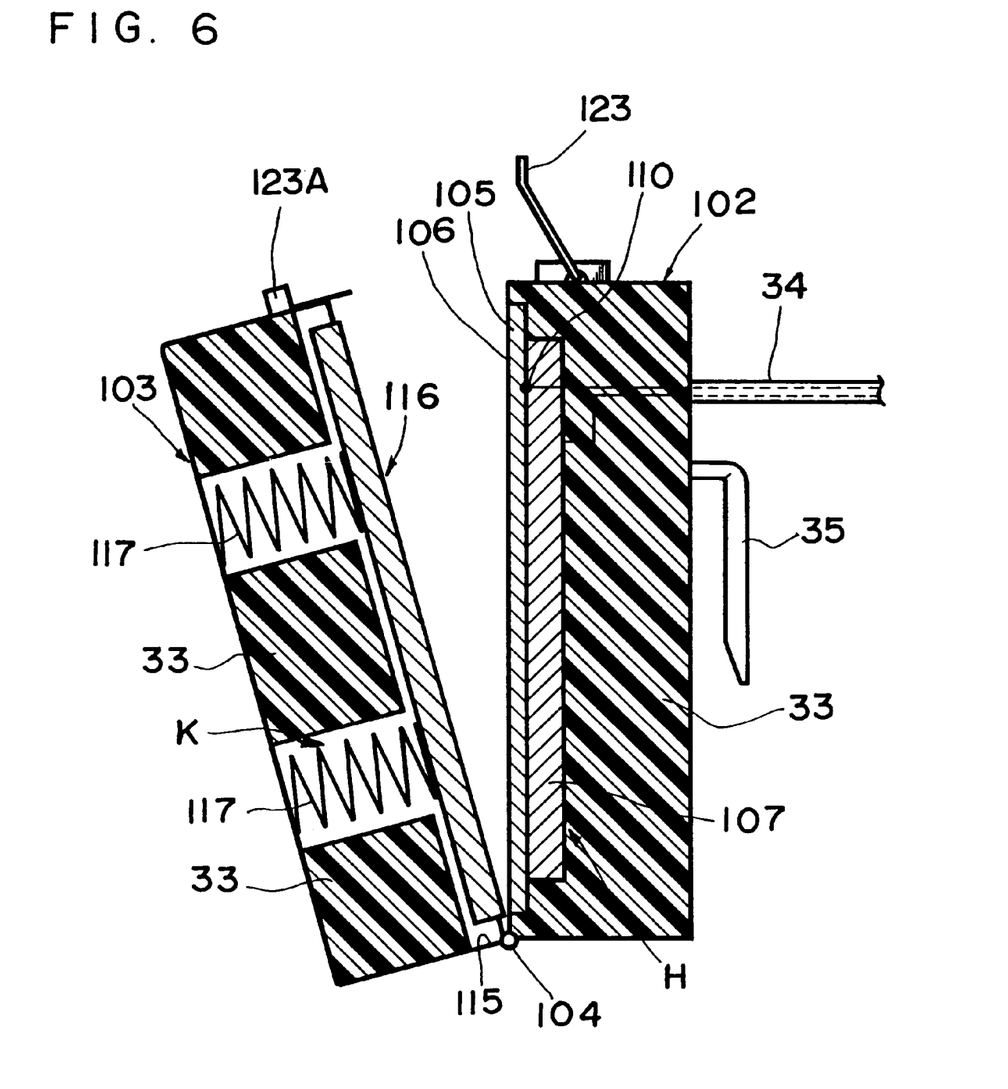
FIG. 6 is a cross-sectional view of a case body and openable lid of the third embodiment.

FIG. 5 and FIG. 6 show a third embodiment. Components the same as for the above respective embodiments are indicated by the same symbols and description is omitted. With this embodiment, an openable lid 103 is openably provided on a small size case body 102 by means of a hinge 104. A front plate 105 of aluminum plate or the like, is provided on a front face of the case body 102. A front face of the front plate 105 forms a case side clamping face 106. An electric heater 107 serving as a heating device, is provided on a rear face of the front plate 105. For this electric heater 107, a flat film heater or the like is used. A control case 31 and a battery case 32 are provided separate from the case body 102. A heat retention control device 108 is provided in the control case 31. The heat retention control device 108 comprises a microcomputer 109 which is electrically connected to a temperature sensor 110 for measuring the temperature of the front plate 105. A thermal insulation material 33 such as polystyrene, is provided in the case body 102 and in the openable lid 103. A heating and heat retention device H is made up from the electric heater 107 and the heat retention control device 108.

The openable lid 103 is formed on the rear face side thereof with a central space having an opening 115. A flat plate lid side clamping face 116 is provided in the opening 115 so as to be moveable towards the front and rear of the openable lid 103 (inwards and outwards relative to the openable lid 103). A plurality of coil springs 117 serving as a resilient urging device, are provided on a rear portion of the lid side clamping face 116. The coil springs 117 are respectively secured at opposite ends to the inner face of the front plate of the openable lid 103, and to the lid side clamping face 116. A resilient pressure applying device K is made up from the lid side clamping face 16 provided on the inner face of the openable lid 103 so as to be moveable inwards and outwards, and the coil springs 117 serving as the resilient urging device. Closing catches 123, 123A which engage with each other, are provided on respective upper portions of the case body 102 and the openable lid 103.

A digital display section 121B which can alternately or simultaneously display temperature and time, is provided centrally on the front face of the control case 31. Around the display section 121B is provided a battery switch 125, a timer switch 122B, a temperature control setting switch 111, and a timer control setting switch 122C. The control case 31 and the case body 102 are electrically connected by a lead 34, while the control case 31 and the battery case 32 are electrically connected by a lead 34A. The battery switch 125 is for switching on the apparatus. With the temperature control setting switch 111, the temperature of the case side clamping face 106 can be changed and set depending on the operation of the switch, while with the timer control setting switch 122C the heating time can be changed and set depending on the operation of the switch.

When the timer switch 122B is operated, counting for the time set by the timer control setting switch 122C is started, and the beforementioned set time and set elapsed time etc. are displayed on the display section 121B under control of the microcomputer 109. Moreover, once the set time has elapsed, then control can be carried out by means of the microcomputer 109 to switch off the electric heater 107 and to generate a sound from a buzzer or the like. The microcomputer 109 displays the temperature of the case side clamping face 106 detected by the temperature sensor 110, on the display section 121B. Once the heating temperature has been set by the temperature control setting switch 111, the microcomputer 109 carries out control so that the case side clamping face 106 becomes the set temperature. The microcomputer 109 incorporates a timer device to thereby measure the time and display for example the elapsed time and the remaining set time, on the display section 121B.

The battery case 32 has an openable lid 32A, so that the batteries inside (not shown in the figure) can be replaced. A belt attachment device 35 is provided on the case body 102, the control case 31 and the battery case 32. This belt attachment device 35 comprises for example, an L-shaped hook for engaging with a belt 36, or a loop through which the belt 36 can pass. FIG. 6 shows an example with a waist belt 36 incorporating a buckle 36A.

By clamping the film 1 between the case side clamping face 106 and the lid side clamping face 116, and applying a uniform pressure and heating at a constant temperature, then the processing agent works evenly. In addition, by maintaining the film 1 at a constant temperature, then development with good contrast, clear coloring and sharp edges without irregularities is possible.

With this embodiment, the heating device is an electric heater 107 which is housed inside the case body 102. The heat retention control device is housed inside the control case 31 separate from the case body 102, and batteries for the electric heater 107 are housed in the battery case 32 separate from the case body 102. This arrangement thus aids portability.

Furthermore with this embodiment, the resilient pressure applying device K comprises: the lid side clamping face 116 provided on the inner face of the openable lid 103 so as to be moveable inwards and outwards relative to the openable lid 103, and the coil springs 117 serving as a resilient urging device for urging the lid side clamping face 116 outwards. Therefore when the openable lid 103 is shut, the film 1 is positively and evenly pressed between the case side clamping face 106, and the lid side clamping face 116 by means of the coil springs 117.

Moreover, with this embodiment, because of the respective belt attachment devices 35 provided on the case body 102, the control case 31 and the battery case 32, then portability is enhanced.

Furthermore, the temperature control setting switch 111 serving as a temperature setting device for setting a temperature of the case side clamping face 106, the display section 121B for displaying the temperature of the case side clamping face 106, and the microcomputer 109 incorporating a timer device which can measure time and display this in the display section 121B, are provided in the control case 31. Therefore the film 1 can be held at a desired temperature by means of the temperature control setting switch 111, and this holding temperature can be verified by the display section 121B.

The present invention is not limited to the abovementioned embodiments, and can be embodied in various different forms within the scope of the gist of the invention. For example, the shape of the case body can be selected as appropriate. Moreover, the resilient urging device is not limited to a plate spring or a coil spring, but may be a rubber spring or air cushion. Furthermore, the heating device is not limited to an electric heater, and may use various types of heating devices. Also, it is possible to use only one or other of the resilient pressure applying device K or the sponge 19 (resilient pressure applying device). Additionally, regarding the direction of the front and rear surfaces of the film with respect to the film clamping face, the positive paper can be positioned to face either the case side clamping face or the lid side clamping face. Moreover, two films can be clamped and developed simultaneously and the same effect obtained.

What is claimed is:

1. A development assisting apparatus for instant camera film comprising:

a case body;

a case side clamping face provided a front surface of said case body, said case side clamping face protruding outwards:

an openable lid openable and closeable relative to said case side clamping face, a lower end of said openable lid being pivotably mounted to a lower end of the front face of said case body, a lid side clamping face provided on an inner face of said openable lid and facing said case side clamping face;

a lid restraining member for holding said openable lid at an acute angle suitable for receiving the film when said openable lid is opened from a vertical orientation;

a resilient pressure applying mechanism for applying pressure to said film provided in said openable lid, said resilient pressure applying mechanism comprising a support for supporting said lid side clamping face to be movable inwards and outwards relative to said openable lid, and a resilient biasing member for urging said lid side clamping face toward said case side clamping face;

a heating unit housed inside said case body for heating said case side clamping face; and a heat retention unit housed inside said case body for maintaining a temperature of instant camera film which is pressingly clamped between said case side clamping face and said lid side clamping face, said heat retention unit comprising a heat retention control unit for maintaining said case side clamping face at substantially 27 to 35 degrees centigrade.

2. A development assisting apparatus for instant camera film according to claim 1, further comprising:

a folded retaining sheet, vertically mounted with its folded end located downwards an upper part of a front half of said folded retaining sheet being fixed to the inner face of said openable lid, while an upper part of a back half of said retaining sheet being fixed to the front face of said case body, said retaining sheet thereby retaining a lower edge of an instant camera film at the folded end.

3. A development assisting apparatus for instant camera film according to claim 1, further comprising:

a cooling fan provided inside said case body for controlling heating overshoot; and ventilation openings provided in said case body for venting air blown by said cooling fan.

4. A development assisting apparatus for instant camera film according to claim 3, said heating unit comprising an electric heater, and said case body comprising a front plate mounted to a front face of the case body, said case side clamping face being mounted to a front face of said front plate, said electric heater being mounted to a rear face of said front plate, said cooling fan being disposed in a rear portion inside said case body, and said ventilation holes being provided on a back surface of said case body.

5. A development assisting apparatus for instant camera film according to claim 4, wherein said electric heater is a ceramic heater.

6. A development assisting apparatus for instant camera film according to claim 4, further comprising:

a temperature setting system for setting a temperature of said case side clamping face;

a temperature display for displaying the temperature of said case side clamping face; and a timer for measuring time.

7. A development assisting apparatus for instant camera film comprising:

a case body;

a case side clamping face provided on a front surface of said case body;

an openable lid openable and closeable relative to said case side clamping face, a lower end of said openable lid being pivotably mounted to a lower end of the front face of said case body, a lid side clamping face provided on an inner face of said openable lid and facing said case side clamping face;

a heating unit housed inside said case body, including an electric heater for heating said case side clamping means;

a control case separate from said case body, a heat retention control unit for controlling said heating unit to heat said case side clamping face unit for maintaining a temperature of instant camera film which is pressingly clamped between said case side clamping face and said lid side clamping face at substantially 27 to 35 degrees centigrade, said heat retention control unit being housed in said control case and said heat retention control unit and control case being connected to said case body and said electric heater via a wire;

a battery case separate from said case body;

a battery for said electric heater and said control unit housed within said battery case, said battery case and said battery being electrically connected with said electric heater and said control unit via a wire; and a belt attachment mechanism for fastening at least one of said case body, said control case and said battery case to a belt worn by a user.

8. A development assisting apparatus for instant camera film according to claim 7, further comprising:

a resilient pressure applying mechanism for applying pressure to said film provided in said openable lid, said resilient pressure applying mechanism comprising a support for supporting said lid side clamping face to be movable inwards and outwards relative to said openable lid and a resilient biasing member for urging said lid side clamping face toward said case side clamping face.

9. A development assisting apparatus for instant camera film according to claim 7, said control case comprising:

a temperature setting system for setting a temperature of said case side clamping face;

a temperature display for displaying the temperature of said case side clamping face; and a timer for measuring time.

* * * * *

UNITED STATES PATENT AND TRADEMARK OFFICE
CERTIFICATE OF CORRECTION

PATENT NO. : 5,930,548
DATED : July 27, 1999
INVENTOR(S) : K. WATANABE

It is certified that error appears in the above-identified patent and that said Letters Patent is hereby corrected as shown below:

At column 8, line 34 (claim 1, line 4) of the printed patent, after "provided" insert ---on---.

Signed and Sealed this

Nineteenth Day of December, 2000

Attest:

Q. TODD DICKINSON

*Attesting Officer*  *Commissioner of Patents and Trademarks*